United States Patent
Worrell et al.

(10) Patent No.: US 9,544,402 B2
(45) Date of Patent: Jan. 10, 2017

(54) MULTI-RULE APPROACH TO ENCODING A GROUP OF RULES

(71) Applicant: CAVIUM, INC., San Jose, CA (US)

(72) Inventors: Frank Worrell, San Jose, CA (US); Rajan Goyal, Saratoga, CA (US); Satyanarayana Lakshmipathi Billa, Sunnyvale, CA (US)

(73) Assignee: CAVIUM, INC., San Jose, CA (US)

( * ) Notice: Subject to any disclaimer, the term of this patent is extended or adjusted under 35 U.S.C. 154(b) by 122 days.

(21) Appl. No.: 14/145,918

(22) Filed: Dec. 31, 2013

(65) Prior Publication Data
US 2015/0189046 A1 Jul. 2, 2015

(51) Int. Cl.
| | |
|---|---|
| *G06F 21/00* | (2013.01) |
| *H04L 29/06* | (2006.01) |
| *H04L 12/851* | (2013.01) |

(52) U.S. Cl.
CPC ........... *H04L 69/22* (2013.01); *H04L 47/2441* (2013.01)

(58) Field of Classification Search
None
See application file for complete search history.

(56) References Cited

U.S. PATENT DOCUMENTS

| | | | |
|---|---|---|---|
| 5,107,361 A | 4/1992 | Kneidinger et al. | |
| 5,214,653 A | 5/1993 | Elliott et al. | |
| 5,463,777 A | 10/1995 | Bialkowski et al. | |
| 5,584,026 A | 12/1996 | Knudsen et al. | |
| 5,682,535 A | 10/1997 | Knudsen | |
| 5,893,142 A | 4/1999 | Moyer et al. | |
| 5,893,911 A | 4/1999 | Piskiel et al. | |
| 6,212,184 B1 | 4/2001 | Venkatachary et al. | |

(Continued)

FOREIGN PATENT DOCUMENTS

| | | |
|---|---|---|
| EP | 2 276 217 A2 | 1/2011 |
| WO | 2004/013777 A1 | 2/2004 |

(Continued)

OTHER PUBLICATIONS

Abdelghani et al. (2005) "Packet Classification Using Adaptive Rule Cutting," In; The IEEE Proc. of Adv. Indus. Conf. on Telecom. pp. 28-33.

(Continued)

*Primary Examiner* — Farid Homayounmehr
*Assistant Examiner* — Maung Lwin
(74) *Attorney, Agent, or Firm* — Weber Hsiao Brown Rudnick LLP

(57) ABSTRACT

A multi-rule approach for encoding rules grouped in a rule chunk is provided. The approach includes a multi-rule with a multi-rule header representing headers of the rules and, in some cases, dimensional data representing dimensional data of the rules. The approach further includes disabling dimension matching of always matching dimensions, responding to an always match rule with a match response without matching, interleaving minimum/maximum values in a range field, interleaving value/mask values in a mask field, and for a given rule of rule chunk, encoding a priority field at the end of dimension data stored for the rule in the multi-rule. Advantageously, this approach provides efficient storage of rules and enables the efficient comparison of rules to keys.

15 Claims, 16 Drawing Sheets

(56) References Cited

U.S. PATENT DOCUMENTS

| | | |
|---|---|---|
| 6,233,575 B1 | 5/2001 | Agrawal et al. |
| 6,298,340 B1 | 10/2001 | Calvignac et al. |
| 6,341,130 B1 | 1/2002 | Lakshman et al. |
| 6,467,019 B1 | 10/2002 | Washburn |
| 6,473,763 B1 | 10/2002 | Corl et al. |
| 6,476,763 B2 | 11/2002 | Allen |
| 6,510,509 B1* | 1/2003 | Chopra et al. ............... 712/13 |
| 6,539,394 B1 | 3/2003 | Calvignac et al. |
| 6,567,408 B1 | 5/2003 | Li et al. |
| 6,587,466 B1 | 7/2003 | Bhattacharya et al. |
| 6,636,480 B1 | 10/2003 | Walla et al. |
| 6,658,002 B1 | 12/2003 | Ross et al. |
| 6,735,600 B1 | 5/2004 | Andreev |
| 6,868,414 B2 | 3/2005 | Khanna et al. |
| 6,918,031 B2 | 7/2005 | Wilson |
| 6,980,555 B2 | 12/2005 | Mar |
| 7,039,641 B2 | 5/2006 | Woo |
| 7,046,848 B1 | 5/2006 | Olcott |
| 7,110,407 B1* | 9/2006 | Khanna ............... H04L 45/00 370/392 |
| 7,133,409 B1* | 11/2006 | Willardson ............ H04L 45/742 370/389 |
| 7,225,188 B1 | 5/2007 | Gai et al. |
| 7,260,558 B1 | 8/2007 | Cheng et al. |
| 7,350,040 B2* | 3/2008 | Marinescu ............ G06F 21/00 711/152 |
| 7,366,728 B2 | 4/2008 | Corl et al. |
| 7,370,361 B2 | 5/2008 | de los Santos et al. |
| 7,392,349 B1 | 6/2008 | Mathur et al. |
| 7,415,472 B2 | 8/2008 | Testa |
| 7,441,022 B1 | 10/2008 | Schuba et al. |
| 7,509,300 B2 | 3/2009 | Sahni et al. |
| 7,536,476 B1 | 5/2009 | Alleyne |
| 7,546,234 B1 | 6/2009 | Deb et al. |
| 7,554,949 B2* | 6/2009 | Chen ............... H04L 63/0227 370/331 |
| 7,571,156 B1 | 8/2009 | Gupta et al. |
| 7,590,860 B2* | 9/2009 | Leporini ............ G06F 21/10 380/200 |
| 7,594,081 B2 | 9/2009 | Bouchard et al. |
| 7,613,926 B2 | 11/2009 | Edery et al. |
| 7,634,408 B1 | 12/2009 | Mohri |
| 7,636,717 B1 | 12/2009 | Gupta et al. |
| 7,702,629 B2 | 4/2010 | Cytron et al. |
| 7,710,988 B1 | 5/2010 | Tripathi et al. |
| 7,711,893 B1* | 5/2010 | Venkatachary ............ 711/108 |
| 7,761,890 B1* | 7/2010 | Harvey ............ G01R 1/071 370/270 |
| 7,870,161 B2 | 1/2011 | Wang |
| 7,873,992 B1* | 1/2011 | Daily ............ H04L 41/0681 726/11 |
| 7,937,355 B2 | 5/2011 | Corl et al. |
| 7,949,683 B2 | 5/2011 | Goyal |
| 7,962,434 B2 | 6/2011 | Estan et al. |
| 7,990,893 B1 | 8/2011 | Singh |
| 7,992,169 B1* | 8/2011 | Harvey ............ G01R 1/071 380/210 |
| 8,005,869 B2 | 8/2011 | Corl et al. |
| 8,015,085 B2 | 9/2011 | Blagg et al. |
| 8,024,802 B1 | 9/2011 | Preston |
| 8,051,085 B1 | 11/2011 | Srinivasan et al. |
| 8,111,697 B1 | 2/2012 | Panwar et al. |
| 8,156,507 B2 | 4/2012 | Brjazovski et al. |
| 8,165,125 B2 | 4/2012 | Kim et al. |
| 8,180,803 B2 | 5/2012 | Goyal |
| 8,301,788 B2 | 10/2012 | Bouchard et al. |
| 8,352,391 B1 | 1/2013 | Kapadia |
| 8,392,590 B2 | 3/2013 | Bouchard et al. |
| 8,407,794 B2 | 3/2013 | Kim et al. |
| 8,447,120 B2 | 5/2013 | Ji et al. |
| 8,473,523 B2 | 6/2013 | Goyal |
| 8,477,611 B2 | 7/2013 | Lim |
| 8,477,773 B2* | 7/2013 | Sundstrom ............... 341/51 |
| 8,543,528 B2 | 9/2013 | Lunteren |
| 8,554,698 B2 | 10/2013 | Bando et al. |
| 8,566,344 B2 | 10/2013 | Bando et al. |
| 8,800,021 B1* | 8/2014 | Swaminathan ..... H04L 63/0209 726/11 |
| 8,856,203 B1* | 10/2014 | Schelp et al. ............... 709/200 |
| 8,934,488 B2 | 1/2015 | Goyal et al. |
| 8,937,952 B2 | 1/2015 | Goyal et al. |
| 8,937,954 B2 | 1/2015 | Goyal et al. |
| 8,990,259 B2 | 3/2015 | Billa et al. |
| 9,137,340 B2 | 9/2015 | Goyal et al. |
| 9,183,244 B2 | 11/2015 | Bullis et al. |
| 9,344,366 B2 | 5/2016 | Bouchard et al. |
| 2001/0006520 A1 | 7/2001 | Moulsey et al. |
| 2002/0023089 A1 | 2/2002 | Woo |
| 2003/0005144 A1 | 1/2003 | Engel et al. |
| 2003/0028674 A1 | 2/2003 | Boden |
| 2003/0108043 A1 | 6/2003 | Liao |
| 2003/0126272 A1 | 7/2003 | Corl, Jr. et al. |
| 2003/0156586 A1* | 8/2003 | Lee et al. ............... 370/392 |
| 2003/0223421 A1* | 12/2003 | Rich et al. ............... 370/389 |
| 2004/0006668 A1* | 1/2004 | Park et al. ............... 711/108 |
| 2004/0158744 A1 | 8/2004 | Deng et al. |
| 2004/0162826 A1 | 8/2004 | Wyschogrod et al. |
| 2004/0172234 A1 | 9/2004 | Dapp et al. |
| 2004/0193563 A1 | 9/2004 | Hagelin |
| 2004/0225999 A1 | 11/2004 | Nuss |
| 2004/0258067 A1* | 12/2004 | Irish ............ H04L 47/10 370/392 |
| 2004/0264384 A1 | 12/2004 | Deval et al. |
| 2005/0013293 A1 | 1/2005 | Sahita |
| 2005/0028114 A1 | 2/2005 | Gould et al. |
| 2005/0035784 A1 | 2/2005 | Gould et al. |
| 2005/0157641 A1 | 7/2005 | Roy |
| 2005/0177736 A1 | 8/2005 | de los Santos et al. |
| 2005/0238010 A1 | 10/2005 | Panigrahy et al. |
| 2005/0240604 A1 | 10/2005 | Corl et al. |
| 2005/0278781 A1 | 12/2005 | Zhao et al. |
| 2006/0002386 A1* | 1/2006 | Yik et al. ............... 370/389 |
| 2006/0026138 A1 | 2/2006 | Robertson et al. |
| 2006/0029104 A1 | 2/2006 | Jungck |
| 2006/0039372 A1* | 2/2006 | Sarkinen et al. ............ 370/389 |
| 2006/0059165 A1 | 3/2006 | Bosloy et al. |
| 2006/0059314 A1 | 3/2006 | Bouchard et al. |
| 2006/0069872 A1 | 3/2006 | Bouchard et al. |
| 2006/0075206 A1 | 4/2006 | Bouchard et al. |
| 2006/0085533 A1 | 4/2006 | Hussain et al. |
| 2006/0101195 A1 | 5/2006 | Jain |
| 2006/0130142 A1 | 6/2006 | Mester et al. |
| 2006/0136570 A1 | 6/2006 | Pandya |
| 2006/0155915 A1 | 7/2006 | Pereira |
| 2006/0221954 A1* | 10/2006 | Narayan ............ H04L 45/00 370/389 |
| 2006/0288024 A1 | 12/2006 | Braica |
| 2007/0011734 A1 | 1/2007 | Balakrishnan et al. |
| 2007/0115966 A1 | 5/2007 | Tzeng |
| 2007/0168377 A1 | 7/2007 | Zabarsky |
| 2007/0192863 A1 | 8/2007 | Kapoor et al. |
| 2007/0240229 A1* | 10/2007 | Yoon ............... G06F 21/10 726/27 |
| 2008/0031258 A1 | 2/2008 | Acharya et al. |
| 2008/0034427 A1 | 2/2008 | Cadambi et al. |
| 2008/0059464 A1 | 3/2008 | Law et al. |
| 2008/0071783 A1 | 3/2008 | Langmead et al. |
| 2008/0082946 A1 | 4/2008 | Zilic et al. |
| 2008/0097959 A1 | 4/2008 | Chen et al. |
| 2008/0101371 A1 | 5/2008 | Law et al. |
| 2008/0109392 A1 | 5/2008 | Nandy |
| 2008/0109431 A1 | 5/2008 | Kori |
| 2008/0140600 A1 | 6/2008 | Pandya |
| 2008/0140631 A1 | 6/2008 | Pandya |
| 2008/0209540 A1 | 8/2008 | Deng et al. |
| 2008/0229415 A1 | 9/2008 | Kapoor et al. |
| 2008/0262991 A1 | 10/2008 | Kapoor et al. |
| 2008/0270833 A1 | 10/2008 | McMillen |
| 2008/0271147 A1 | 10/2008 | Mohanan et al. |
| 2008/0291916 A1* | 11/2008 | Xiong ............... H04L 45/00 370/392 |
| 2008/0310440 A1 | 12/2008 | Chen et al. |
| 2009/0006847 A1 | 1/2009 | Abzarian et al. |

(56) References Cited

U.S. PATENT DOCUMENTS

| | | |
|---|---|---|
| 2009/0034530 A1 | 2/2009 | Basso et al. |
| 2009/0063825 A1 | 3/2009 | McMillen et al. |
| 2009/0119279 A1 | 5/2009 | Goyal et al. |
| 2009/0119399 A1 | 5/2009 | Hussain et al. |
| 2009/0125470 A1 | 5/2009 | Shah et al. |
| 2009/0138440 A1 | 5/2009 | Goyal |
| 2009/0138494 A1 | 5/2009 | Goyal |
| 2009/0185568 A1 | 7/2009 | Cho et al. |
| 2009/0217341 A1 | 8/2009 | Sun et al. |
| 2009/0262659 A1 | 10/2009 | Sturges et al. |
| 2009/0274384 A1 | 11/2009 | Jakobovits |
| 2009/0323383 A1 | 12/2009 | Mondaeev et al. |
| 2010/0034202 A1 | 2/2010 | Lu et al. |
| 2010/0037056 A1 | 2/2010 | Follis et al. |
| 2010/0067535 A1 | 3/2010 | Ma et al. |
| 2010/0094906 A1 | 4/2010 | Della-Libera et al. |
| 2010/0095162 A1 | 4/2010 | Inakoshi |
| 2010/0110936 A1 | 5/2010 | Bailey et al. |
| 2010/0114973 A1 | 5/2010 | Goyal |
| 2010/0146623 A1 | 6/2010 | Namjoshi et al. |
| 2010/0153326 A1 | 6/2010 | Bernardes et al. |
| 2010/0153420 A1 | 6/2010 | Yang et al. |
| 2010/0158394 A1 | 6/2010 | Chang et al. |
| 2010/0175124 A1 | 7/2010 | Miranda |
| 2010/0192225 A1 | 7/2010 | Ma et al. |
| 2010/0199355 A1 | 8/2010 | Ouddan et al. |
| 2010/0281532 A1 | 11/2010 | Deng et al. |
| 2011/0016154 A1 | 1/2011 | Goyal et al. |
| 2011/0038375 A1 | 2/2011 | Liu et al. |
| 2011/0090842 A1 | 4/2011 | Hirano et al. |
| 2011/0093484 A1 | 4/2011 | Bando et al. |
| 2011/0093496 A1 | 4/2011 | Bando et al. |
| 2011/0113191 A1 | 5/2011 | Pandya |
| 2011/0119440 A1 | 5/2011 | Pandya |
| 2011/0137930 A1 | 6/2011 | Hao et al. |
| 2011/0173149 A1* | 7/2011 | Schon .................. 706/48 |
| 2011/0173490 A1 | 7/2011 | Narayanaswamy et al. |
| 2011/0185077 A1 | 7/2011 | Bremler-Barr et al. |
| 2011/0219010 A1 | 9/2011 | Lim |
| 2011/0238855 A1 | 9/2011 | Korsunsky et al. |
| 2011/0264822 A1 | 10/2011 | Ferguson et al. |
| 2011/0295779 A1 | 12/2011 | Chen et al. |
| 2012/0017262 A1 | 1/2012 | Kapoor et al. |
| 2012/0078832 A1 | 3/2012 | Lunteren |
| 2012/0143854 A1 | 6/2012 | Goyal et al. |
| 2012/0203718 A1 | 8/2012 | Biran et al. |
| 2012/0215569 A1 | 8/2012 | Bauchot et al. |
| 2012/0221494 A1 | 8/2012 | Pasetto et al. |
| 2012/0221497 A1 | 8/2012 | Goyal et al. |
| 2012/0311529 A1 | 12/2012 | Beveridge et al. |
| 2012/0331007 A1 | 12/2012 | Billa et al. |
| 2012/0331554 A1 | 12/2012 | Goyal et al. |
| 2013/0034100 A1 | 2/2013 | Goyal et al. |
| 2013/0034106 A1* | 2/2013 | Goyal .................. G06N 5/02 370/400 |
| 2013/0036083 A1 | 2/2013 | Goyal |
| 2013/0036102 A1* | 2/2013 | Goyal .................. G06N 5/02 707/694 |
| 2013/0036471 A1 | 2/2013 | Bouchard et al. |
| 2013/0036477 A1 | 2/2013 | Goyal |
| 2013/0039366 A1 | 2/2013 | Goyal et al. |
| 2013/0060727 A1 | 3/2013 | Goyal et al. |
| 2013/0070753 A1 | 3/2013 | Sahni et al. |
| 2013/0085978 A1 | 4/2013 | Goyal et al. |
| 2013/0133064 A1 | 5/2013 | Goyal et al. |
| 2013/0191916 A1 | 7/2013 | Yao et al. |
| 2013/0218853 A1 | 8/2013 | Bullis et al. |
| 2013/0232104 A1 | 9/2013 | Goyal et al. |
| 2013/0282766 A1 | 10/2013 | Goyal et al. |
| 2014/0013104 A1* | 1/2014 | Vinnik .................. H04L 63/08 713/150 |
| 2014/0079063 A1* | 3/2014 | Edsall .................. H04L 49/253 370/392 |
| 2014/0214749 A1 | 7/2014 | Ruehle |
| 2014/0229386 A1* | 8/2014 | Tervo .................. G06Q 20/32 705/71 |
| 2014/0279850 A1 | 9/2014 | Goyal et al. |
| 2014/0280357 A1 | 9/2014 | Goyal et al. |
| 2014/0281809 A1 | 9/2014 | Goyal et al. |
| 2015/0066927 A1 | 3/2015 | Goyal et al. |
| 2015/0067123 A1 | 3/2015 | Goyal et al. |
| 2015/0067200 A1 | 3/2015 | Goyal et al. |
| 2015/0067776 A1 | 3/2015 | Goyal et al. |
| 2015/0067836 A1 | 3/2015 | Billa et al. |
| 2015/0117461 A1 | 4/2015 | Goyal et al. |
| 2015/0186786 A1 | 7/2015 | Goyal et al. |
| 2015/0189046 A1 | 7/2015 | Worrell et al. |
| 2015/0193689 A1 | 7/2015 | Worrell |
| 2015/0220454 A1 | 8/2015 | Goyal et al. |
| 2015/0220845 A1 | 8/2015 | Goyal et al. |

FOREIGN PATENT DOCUMENTS

| | | |
|---|---|---|
| WO | 2007/109445 A1 | 9/2007 |
| WO | 2008/005772 A2 | 1/2008 |
| WO | 2009/145712 A1 | 12/2009 |
| WO | 2012/177736 A1 | 12/2012 |
| WO | 2012/177752 A1 | 12/2012 |
| WO | 2013/020002 A1 | 2/2013 |
| WO | 2013/020003 A1 | 2/2013 |
| WO | 2013/078053 A1 | 5/2013 |

OTHER PUBLICATIONS

Aho et al. (1977) Ch. 3 In; Principles of Compiler Design. Addison-Wesley. pp. 73-124.

Baboescu et al. (2001) "Scalable Packet Classification," In; The Proceedings of the ACM SIGCOMM '01 Conference on Applications, Technologies, Architectures, and Protocols for Computer Communication. pp. 199-210.

Baboescu et al. (2003) "Packet Classification for Core Routers: Is there an alternative to CAMs?" In; The Twenty-Second Annual Joint Conference of the IEEE Computer and Communications, INFOCOM 2003. vol. 1. pp. 53-63.

Becchi et al (2008) "Extending Finite Automata to Efficiently Match Perl-compatible Regular Expressions," In; The Proceedings of the 2008 CoNext Conference. Dec. 9-12, 2008.

Becchi et al. (2007) "A Hybrid Finite Automaton for Practical Deep Packet Inspection," In; The Proceedings of the International Conference on emerging Networking EXperiments and Technologies (CoNEXT), New York, New York. Dec. 2007.

Becchi et al. (2009) "Data Structures, Algorithms and Architechtures for Efficient Regular Expression Evaluation," Washington University. Dissertation for the degree of Doctor of Philosophy. Saint Louis, Missouri.

Branch et al. (2002) "Denial of Service Intrusion Detection Using Time Dependent Deterministic Finite Automata," In; The Proc. Research Conference, Troy, NY, Oct. 2002.

Chodnicki (2011) "An Introduction to Regular Expressions/Adventures with Open Source BI," Adventures with Open Source BI. Accessible on the Internet at URL: available at http://type-exit.org/adventures-with-open-source-bi/2011/05/an-introduction-to-regular-expressions. [Last Accessed Aug. 21, 2015].

Faro et al. (2008) "Efficient Variants of the Backward-Oracle-Matching Algorithm," In; The Proceedings of Prague Stringology Conference, 2008, pp. 146-160.

Gupta et al. (1999) "Packet Classification on Multiple Fields," In; The Proceedings of SIGCOMM '99 Conference on Applications, Technologies, Architectures, and Protocols for Computer Communication (SIGCOMM '99). pp. 147-160.

Gupta et al. (2000) "Classifying Packets With Hierarchical Intelligent Cuttings," IEEE Micro. 20(1):34-41.

Gupta (2000) "Algorithms for Packet Routing Lookups and Packet Classification," Stanford University. Dissertation for the degree of Doctor of Philosophy.

Hoperoft et al. (1979) Ch. 2 In; Introduction to Automata Theory, Languages, and Computation. Addison-Wesley. Reading, Massachusetts.

(56) References Cited

OTHER PUBLICATIONS

Wikipedia "Access control list," Wikimedia Foundation, Inc. Accessible on the Internet at URL: https://en.wikipedia.org/wiki/Access_control_list. [Last Accessed Aug. 21, 2015].
Klarlund (1992) "Progress Measures, Immediate Determinacy, and a Subset Construction for Tree Automata," In; The Proceedings of the Seventh Annual IEEE Symposium on Logic in Computer Science, 1992. LICS '92. pp. 382-393.
Navarro (2001) "NR-grep: A Fast and Flexible Pattern Matching Tool," Software Practice and Experience (SPE). 31:1265-1312.
Navarro (2004) "Pattern Matching," Journal of Applied Statistics. 31(8):925-949.
Pong et al. (2011) "HARP: Rapid Packet Classification via Hashing Round-Down Prefixes," IEEE Transactions on Parallel and Distributed Systems. 22(7):1105•1119.
Qi et al. (2009) "Packet Classification Algorithms: From Theory to Practice," In; The Proceedings of the 28th IEEE Conference on Computer Communications (INFOCOM '09). pp. 648-656.
Rabin et al. (1959) "Finite Automata and their Decision Problems," IBM Journal of Research and Development. 3(2)114-125.
Singh (2002)"Regular Expressions," Seeing With C. Accessible on th Internet at URL: http://www.seeingwithc.org/topic7html.html. [Last Accessed Aug. 24, 2014].
Singh et al. (2003) "Packet Classification Using Multidimensional Cutting," In; The Proceedings of the ACMSIGCOMM '03 Conference on Applications, Technologies, Architectures, and Protocols for Computer Communication (SIGCOMM '03). pp. 213-224.
Sipser (1997) "Introduction to the Theory of Computation," PWS Nondeterminism. Section 1.2 pp. 47-63.
Sun et al. (2008) "HFilter: Hybrid Finite Automaton Based Stream Filtering for Deep and Recursive XML Data," Database and Expert Systems Applications Lecture Notes in Computer Science. 5181:566-580.
Theiling (2001) "Generating Decision Trees for Decoding Binaries" In; The OM '01 Proceedings of the 2001 ACM SIGPLAN workshop on Optimization of middleware and distributed systems. pp. 112-120.
Yu et al. (2006) "A Novel IP Packet Classification Algorithm Based on Hierarchical Intelligent Cuttings," In; The Proceedings of the IEEE 6th International Conference on ITS Telecom. pp. 1033-1036.
Zhang et al. (2010) "On Constructing Efficient Shared Decision Trees for Multiple Packet Filters," In; IEEE INFOCOM'10. San Diego, California.
International Search Report with Written Opinion corresponding to International Patent Application No. PCT/US2012/043307, mailed Dec. 6, 2012.
International Search Report with Written Opinion corresponding to International Patent Application No. PCT/US2012/049406, mailed Oct. 18, 2010.
Office Action corresponding to U.S. Appl. No. 13/168,395, mailed Apr. 20, 2015.
Office Action corresponding to U.S. Appl. No. 13/168,395, mailed Dec. 24, 2014.
Office Action corresponding to U.S. Appl. No. 13/168,395, mailed Dec. 27, 2013.
Office Action corresponding to U.S. Appl. No. 13/168,395, mailed Jun. 10, 2014.
Office Action corresponding to U.S. Appl. No. 13/168,450, mailed Apr. 25, 2013.
Office Action corresponding to U.S. Appl. No. 13/168,450, mailed Feb. 28, 2014.
Office Action corresponding to U.S. Appl. No. 13/168,450, mailed Jun. 6, 2014.
Office Action corresponding to U.S. Appl. No. 13/168,450, mailed Oct. 8, 2014.
Office Action corresponding to U.S. Appl. No. 13/565,775, mailed Aug. 26, 2014.
Office Action corresponding to U.S. Appl. No. 13/565,775, mailed Feb. 9, 2015.
Office Action corresponding to U.S. Appl. No. 13/831,191, mailed Dec. 12, 2014.
Office Action corresponding to U.S. Appl. No. 13/831,191, mailed May 21, 2015.
Office Action corresponding to U.S. Appl. No. 13/831,232, mailed Nov. 21, 2014.
Office Action corresponding to U.S. Appl. No. 13/831,415, mailed Dec. 18, 2014.
Office Action corresponding to U.S. Appl. No. 13/831,415, mailed Jun. 4, 2015.

\* cited by examiner

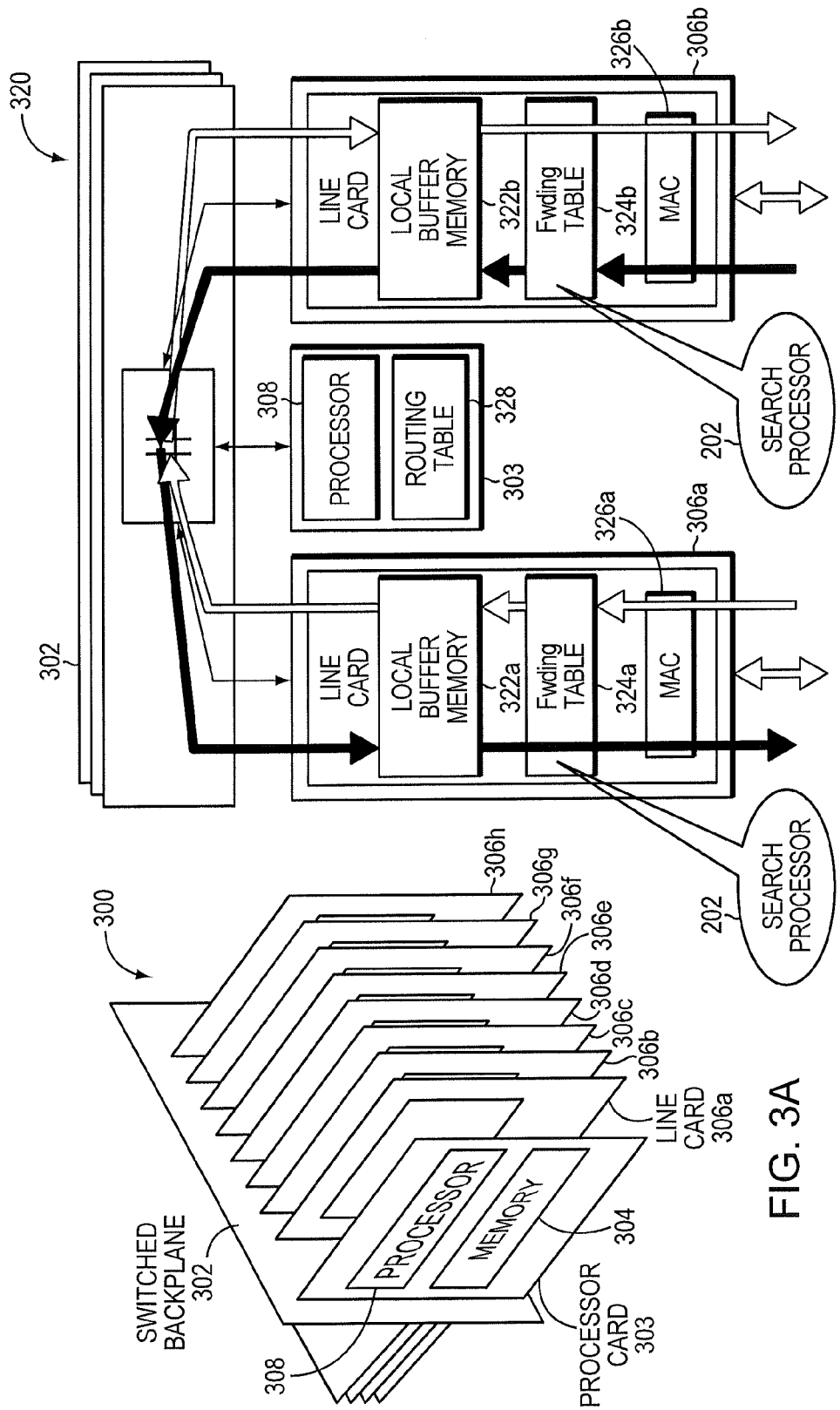

500

515

525

<= higher bits    lower bits =>

| Length | Value |
|--------|-------|
| 530    | 535   |

| Value | Mask |
|-------|------|
| 545   | 550  |

FIG. 5D

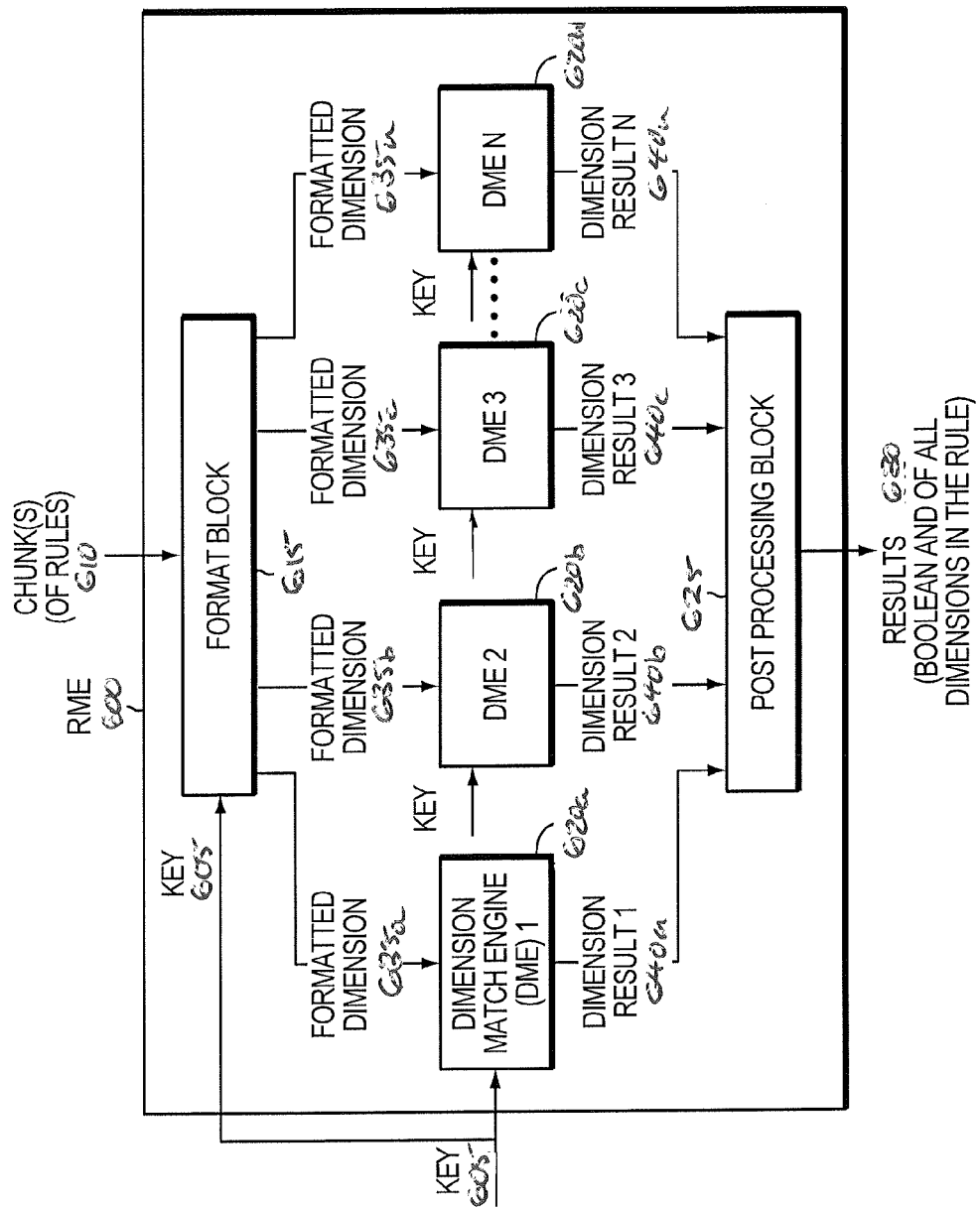

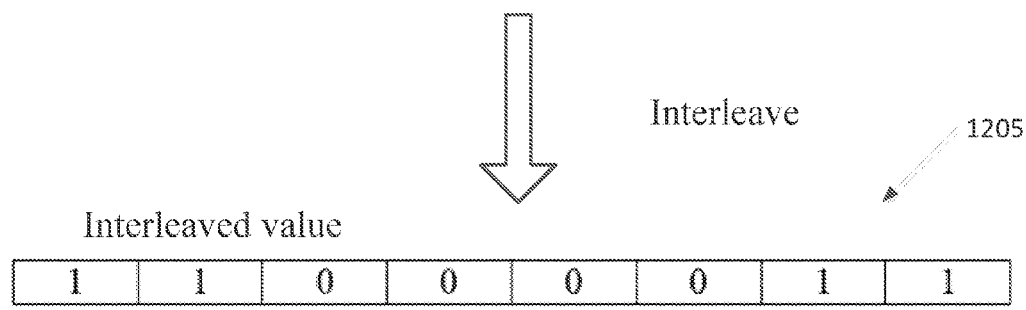
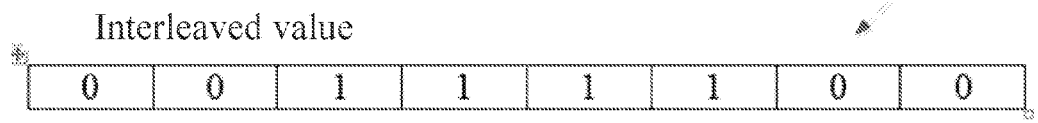
FIG. 12

MULTI-RULE APPROACH TO ENCODING A GROUP OF RULES

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

In accordance with an example, a method for encoding one or more key matching rules grouped in a chunk is provided. The method includes a rule encoding engine, communicatively coupled to memory and provided with a chunk of key matching rules, building a multi-rule corresponding to the chunk. The multi-rule is built by storing in the memory a multi-rule header of the multi-rule. The multi-rule header represents headers of the key matching rules.

In accordance with another example, a system for encoding one or more key matching rules grouped in a chunk is provided. The system includes memory and at least one interface receiving a chunk of key matching rules. The system further includes a rule encoding engine communicatively coupled to the memory and the at least one interface. The rule encoding engine configured to build a multi-rule corresponding to the chunk. The rule encoding engine builds the multi-rule by storing in the memory, storing in the memory a multi-rule header of the multi-rule. The multi-rule header represents headers of the key matching rules.

In accordance with yet another example, a tangible computer-readable storage medium having computer readable instructions stored therein for encoding one or more key matching rules grouped in a chunk is provided. The computer readable instructions when executed by a rule encoding engine, provided with a chunk of each key matching rules, cause the rule encoding engine to build a multi-rule corresponding to the chunk. The rule encoding engine builds the multi-rule by storing in the memory, a multi-rule header of the multi-rule. The multi-rule header representing headers of the key matching rules.

In some examples, any of the aspects above can include one or more of the following features.

In other examples of the method, storing the multi-rule header of the multi-rule further includes storing, consecutively, a rule validity value for each of the key matching rules of the chunk. Storing a first value for a rule validity value corresponding to a subject key matching rule enables matching of the subject key matching rule and storing a second value different than the first value disables matching of the subject key matching rule.

In some examples of the method, storing the rule validity values includes, given a key matching rule that always matches, storing a rule validity having a third value; and given a key matching rule that never matches, storing a rule validity having a fourth value different than the third value.

In other examples of the method, storing the multi-rule header of the multi-rule further includes, given key matching rules each having at least one dimension, storing, consecutively, an enable value for each dimension of the key matching rules of the chunk. Storing a first value for an enable value corresponding to a subject dimension enables matching of the subject dimension and storing a second value different than the first value disables matching of the subject dimension.

In some examples of the method, disabling matching of the subject dimension further includes instructing a decoder to provide an always match dimension result.

In other examples of the method, disabling matching of the subject dimension further includes instructing a decoder not to assign a dimension match engine to the subject dimension.

In some examples of the method, disabling matching of the subject dimension further includes masking the subject dimension for a decoder.

In other examples of the method, storing the multi-rule header of the multi-rule further includes storing, consecutively, a priority value for each of the key matching rules of the chunk in which storing a priority value for subject key matching rule indicates a priority of the subject key matching rule relative to the key matching rules of the chunk.

Some examples of the method further includes, given a key matching rule having at least one dimension, storing in the memory, dimension data of the multi-rule. The dimension data includes, for each key matching rule, a value associated with the at least one dimension of a subject key matching rule.

In some examples of the method, storing the dimension data of the multi-rule further includes for a given key matching rule of the chunk, storing a priority value at the end of the dimension data stored for the rule in the multi-rule.

In other examples of the method, storing the dimension data of the multi-rule includes, given the one dimension of the subject key matching rule is a range field with a minimum value and a maximum value, interleaving the minimum value with the maximum value to form an interleaved value. The examples further include storing in the memory the interleaved value of the range field associated with the subject key matching rule.

In some examples of the method, storing the dimension data of the multi-rule includes, given the one dimension of the subject key matching rule is a mask field with a value and a mask, interleaving the value with the mask to form an interleaved value. The examples include storing in the memory the interleaved value of the mask field associated with the subject key matching rule.

In some examples of the method, the chunk includes one key matching rule.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3A is a diagram of an example of a router architecture.

FIG. 3B is a block diagram of an example of a router employing a search processor.

FIGS. 5A-5D are diagrams of a range field for a range match, exact match field for an exact match, prefix field for a prefix match, and mask field for a mask match, respectively.

FIG. 6 is a block diagram of an example rule match engine.

FIG. 12 is diagram of a range field with an interleaved maximum/minimum value.

DETAILED DESCRIPTION

Figure 1:
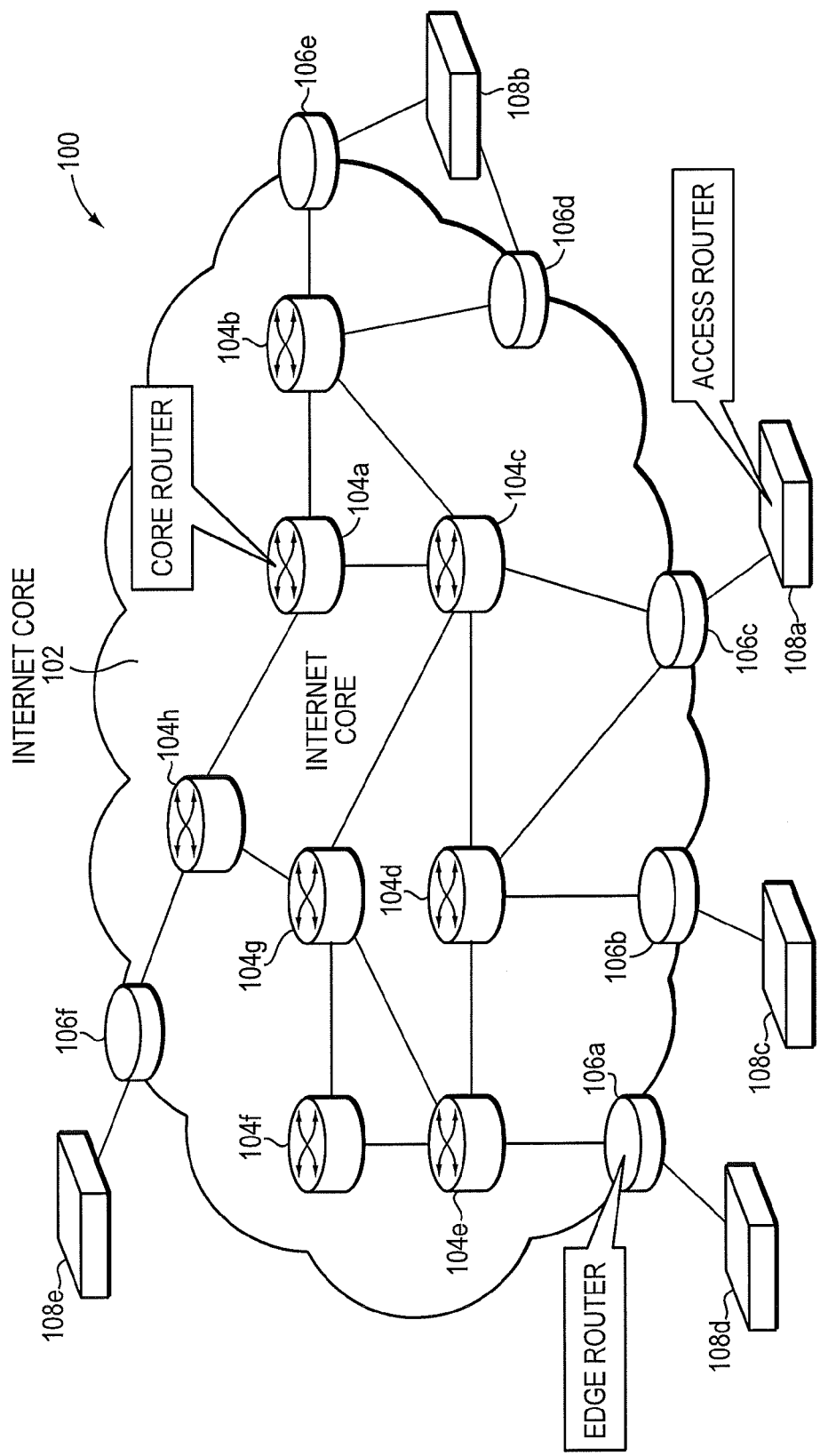
FIG. 1 is a block diagram of a typical network topology including network elements employing examples of a search processor described in this application.

FIG. 1 is a block diagram 100 of a typical network topology including network elements employing example embodiments of a search processor. The network topology includes an Internet core 102 including a plurality of core routers 104a-h. Each of the plurality of core routers 104a-h are connected to at least one other of the plurality of core routers 104a-h. Core routers 104a-h that are on the edge of the Internet core 102 (i.e., core routers 104b-e and 104h) are coupled with at least one edge router 106a-f. Each edge router 106a-f is coupled to at least one access router 108a-e.

The core routers 104a-h are configured to operate in the Internet core 102 or Internet backbone. The core routers 104a-h are configured to support multiple telecommunications interfaces of the Internet core 102 and are further configured to forward packets at a full speed of each of the multiple telecommunications protocols.

The edge routers 106a-f are placed at the edge of the Internet core 102. Edge routers 106a-f bridge access routers 108a-e outside the Internet core 102 and core routers 104a-h in the Internet core 102. Edge routers 106a-f can be configured to employ a bridging protocol to forward packets from access routers 108a-e to core routers 104a-h and vice versa.

The access routers 108a-e can be routers used by an end user, such as a home user or an office, to connect to one of the edge routers 106a-f, which in turn connects to the Internet core 102 by connecting to one of the core routers 104a-h. In this manner, the access routers 108a-e can connect to any other access router 108a-e via the edge routers 106a-f and the interconnected core routers 104a-h.

A search processor described herein can reside in any of the core routers 104a-h, edge routers 106a-f, and access routers 108a-e. The search processor described herein, within each of these routers, is configured to analyze Internet protocol (IP) packets based on a set of rules and forward the IP packets along an appropriate network path.

Figure 2A:
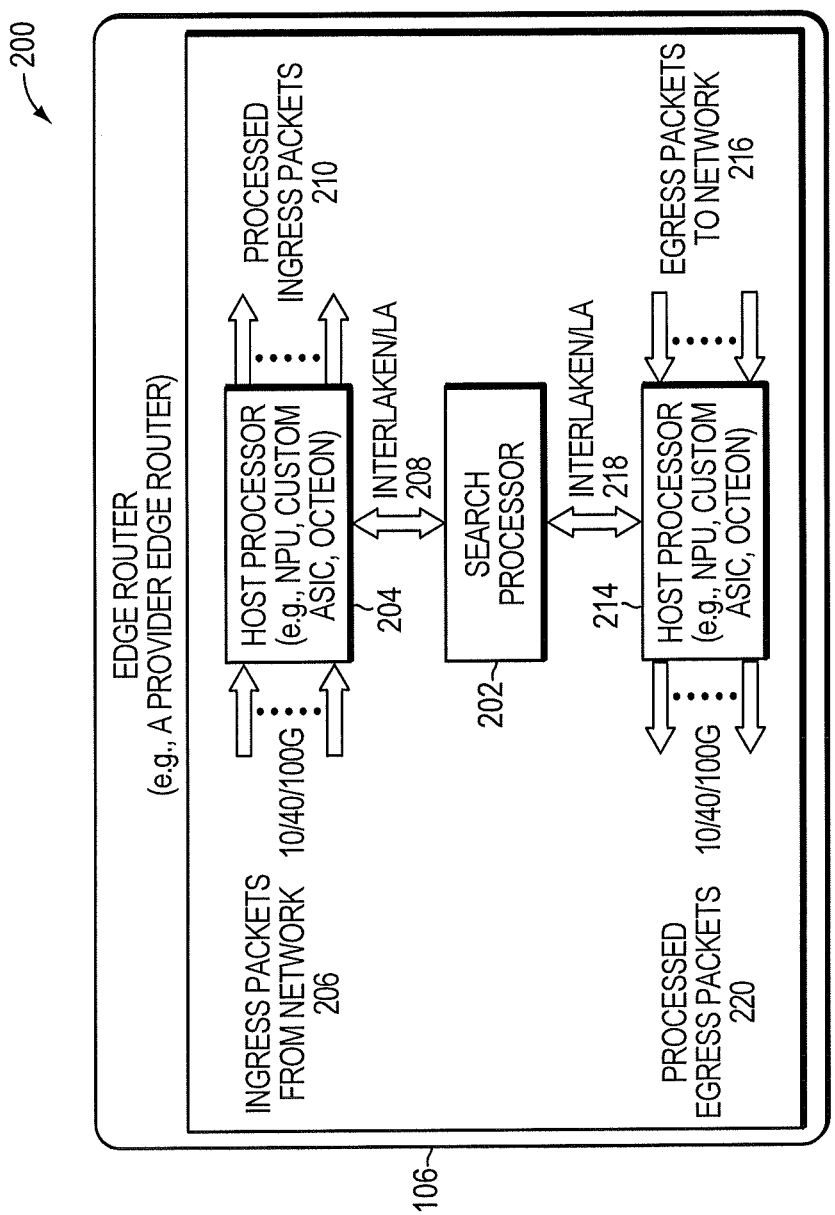
FIGS. 2A-2C are block diagrams illustrating examples of a search processor employed in routers.

FIG. 2A is a block diagram 200 illustrating an example embodiment of a search processor 202 employed in an edge router 106. An edge router 106, such as a provider edge router, includes the search processor 202, a first host processor 204 and a second host processor 214. The first host processor 204 is configured as an ingress host processor. The first host processor 204 receives ingress packets 206 from a network. The first host processor 204 forwards a lookup request including a packet header (or field) from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. The second host processor 214 receives egress packets to send from the network 216. The second host processor 214 forwards a lookup request with a packet header (or field) from the egress packets 216 to the search processor 202 over a second Interlaken interface 218. The search processor 202 then processes the packet header using a plurality of rule processing engines employing a plurality of rules to determine a path to forward the packets on the network. The second host processor 214 forwards the processed ingress packets 220 to another network element in the network.

Figure 2B:
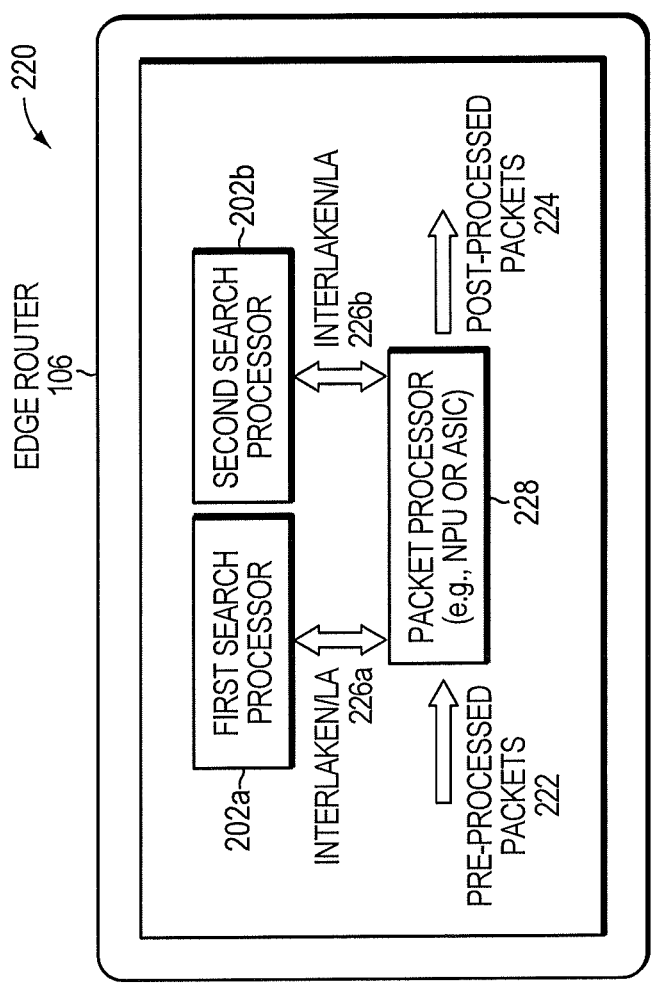

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The plurality of search processors 202a-b are coupled to a packet processor 228 using a plurality of Interlaken interfaces 226a-b, respectively. The edge router 106 receives pre-processed packets 222 at the packet processor 228. The packet processor 228 forwards a lookup request (including packet header or particular fields from packet header) to one of the search processors 202a-b. One of the search processors 202a-b searches the packet headers for an appropriate forwarding destination for the pre-processed packets 222 based on a set of rules and data within the packet header, and responds to the lookup request to the packet processor 228. The packet processor 228 then sends the post processed packets 224 to the network based on the lookup request performed by the search processors 202a-b.

Figure 2C:
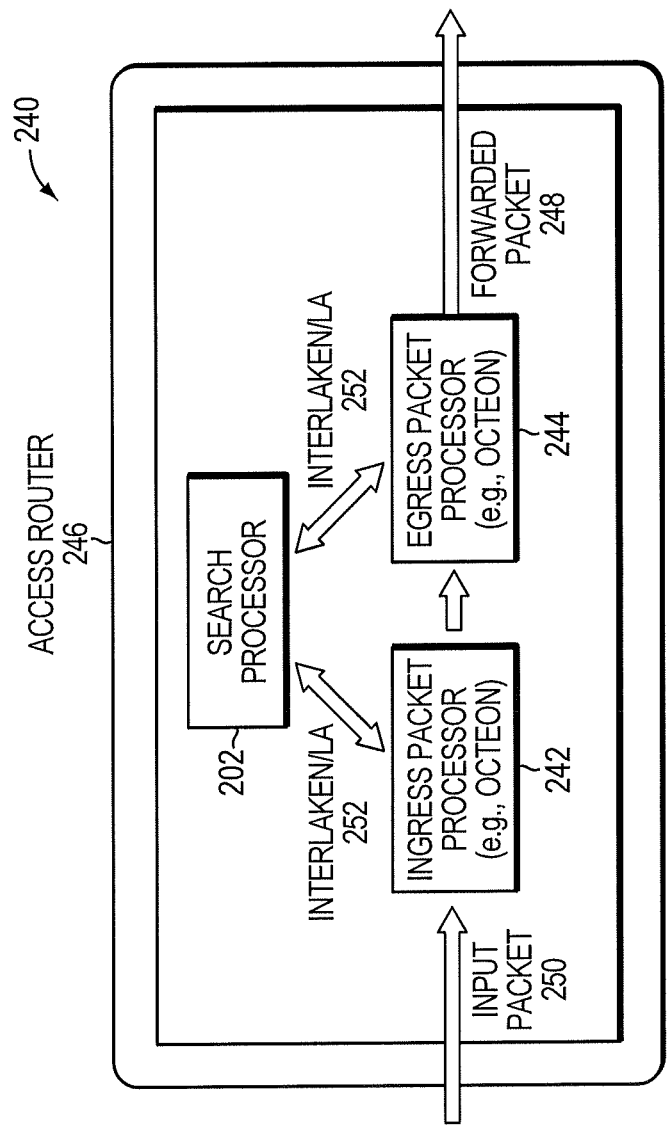

FIG. 2C is a block diagram 240 illustrating an example embodiment of an access router 246 employing the search processor 202. The access router 246 receives an input packet 250 at an ingress packet processor 242. The ingress packet processor 242 then forwards a lookup request with a packet header of the input packet 250 to the search processor 202. The search processor 202 determines, based on packet header of the lookup request, a forwarding path for the input packet 250 and responds to the lookup requests over the Interlaken interface 252 to the egress packet processor 244. The egress packet processor 244 then outputs the forwarded packet 248 to the network.

FIG. 3A is a diagram 300 of an example embodiment of a router architecture. The router architecture includes a switched backplane 302 coupled with a processor card 303 that includes a processor 308 and a memory 304. The switched backplane 302 is further coupled with a plurality of line cards 306a-h. Each line card 306a-h includes a search processor as described herein.

FIG. 3B is a block diagram 320 illustrating an example embodiment of a router employing the search processor 202. The router includes the switched backplane 302 which is coupled to the line cards 306a-b and the processor card 303. The processor card 303 includes a processor 308 and a routing table 328, which can be stored in the memory 304 of the processor card 303. Each line card 306a-b includes a respective local buffer memory 322a-b, a forwarding table 324a-b, and a media access control (MAC) layer 326a-b. The search processor 202 exists within the forwarding table 324a-b of the line card 306a-b.

As an example, a packet is received by the line card 306a at the MAC layer 326a. The MAC layer 326a sends the packet to the forwarding table 324a. Then, the packet and appropriate forwarding table information is stored in the local buffer memory 322a. Based on the determination, the router selects an appropriate line card 306b, stores the packet and forwarding information in the local buffer memory 322b of the appropriate line card, and forwards the packet out to the network.

Figures 3C, 3D:
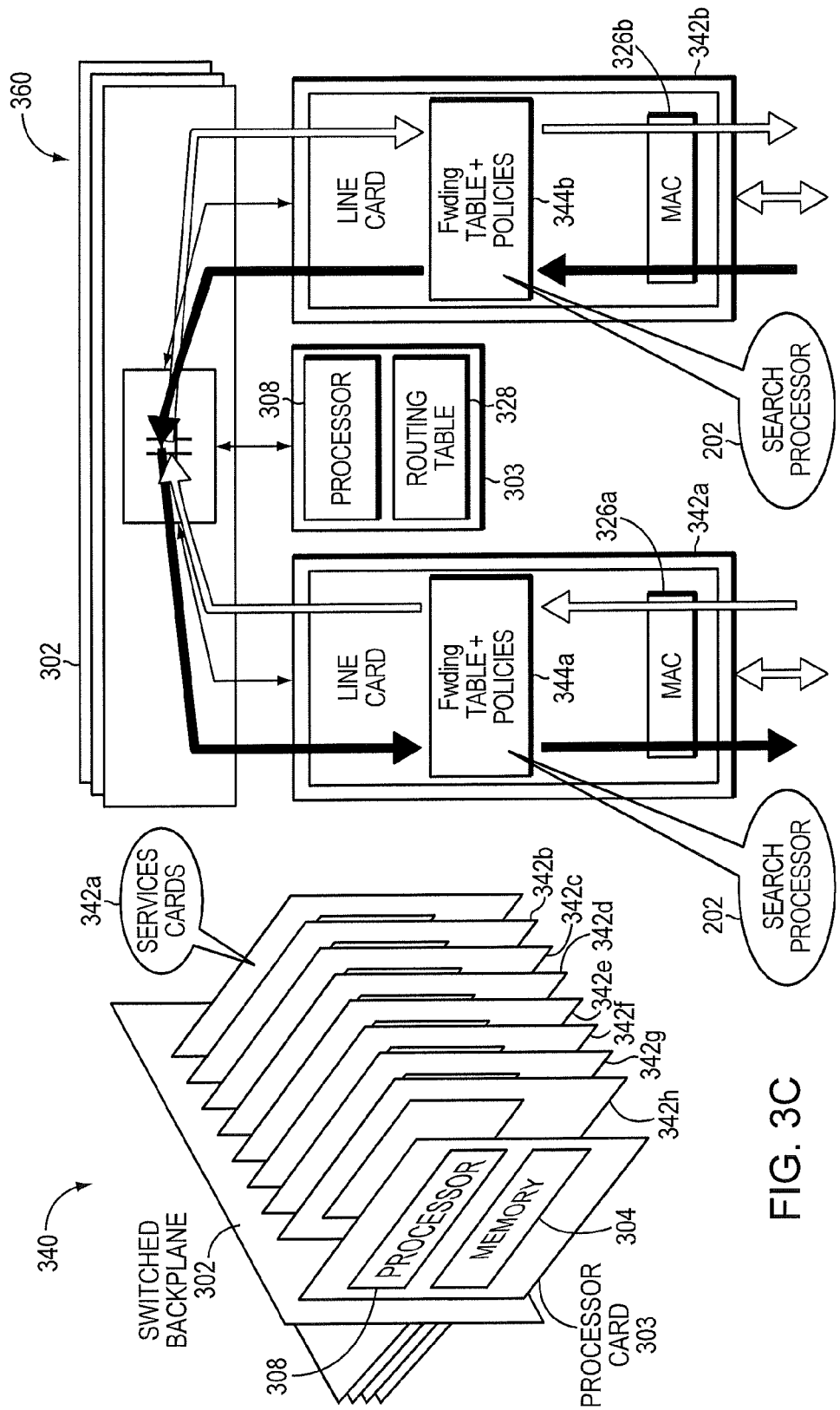
FIG. 3C is a block diagram of an example of a router including a switched backplane.
FIG. 3D is a block diagram of another example of a router employing a search processor.

FIG. 3C is a block diagram 340 of another embodiment of a router including the switched backplane 302. The switched backplane 302 is coupled to the processor card 303, the line cards 342b-h, and a service card 342a. The processor card 303 includes the memory 304 and the processor 308. The service card 342a is a type of line card 342b-h. Further, the search processor described herein can also exist on the service card 342a.

FIG. 3D is a block diagram 360 illustrating an example embodiment of a router employing the switched backplane 302. The switched backplane 302 is coupled with the processor card 303, the service card 342a and line cards 342b-h. The line cards 342a-b can either be a service card 342a or line card 342b-h. The line card 342a-b includes a forwarding table and corresponding policies module 344a-b, and a MAC layer 326a-b. The search processor 202 is included in the line card 342a-b. The line card 342a receives a packet from a network through the MAC layer 326a at the forwarding table and policies module 344a. The search processor 202 processes the packet according to the forwarding table and policies module 344a according to the routing table 328 in the processor card 303 and forwards the packet to an appropriate line card 342b to be forwarded into the network.

Generally speaking, packets received are matched with rules that determine actions to take with a matched packet. Generic packet classification requires a router to classify a packet on the basis of multiple fields in a header of the packet. Each rule of the classifier specifies a class that a packet may belong to, according to criteria on 'F' fields of the packet header, and associates an identifier (e.g., class ID) with each class. For example, each rule in a flow classifier is a flow specification, in which each flow is in a separate class. The identifier uniquely specifies an action associated with each rule. Each rule has multiple fields. An ith field of a rule R, referred to as R[i], is a regular expression on the ith field of the packet header. A packet P matches a particular rule R if for every i, the ith field of the header of P satisfies the regular expression R[i].

Figure 4:
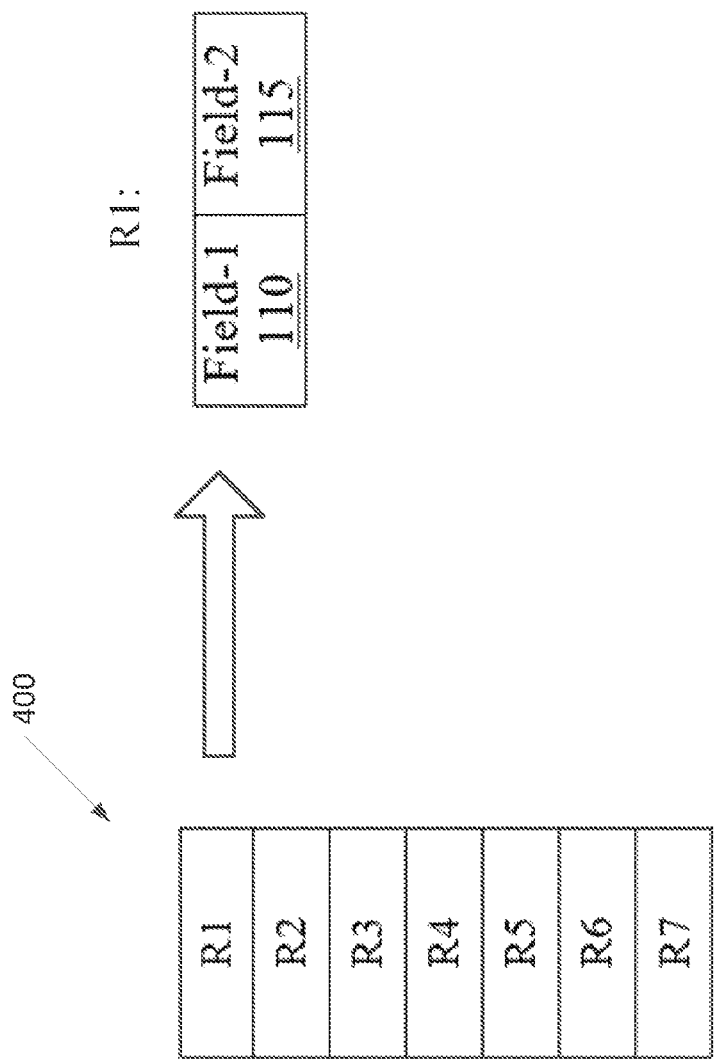
FIG. 4 is a diagram of an example of a classifier table including 2-tuple rules.

FIG. 4 shows an example classifier table 400 including rules for classifying a packet or "key." As shown, the classifier table 400 contains seven rules R1-R7 each containing two fields or "dimensions," Field-1 110, and Field-2 115. (The terms field and dimension are used interchangeably herein.) Although the table 400 shows rules being 2-tuple (e.g., containing only two fields), it should be noted that rules may contain an number of fields n and be n-tuple. Each rule specifies one or more values in each dimension (e.g., an Internet Protocol (IP) address or Layer 4 port or protocol) to be matched against a key.

Figure 5A:
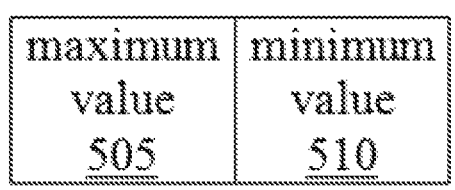
Figure 5B:

With reference to FIGS. 5A-5D, each dimension of a rule is associated with one of the following types of match: range match, exact match, prefix match, and mask match. FIG. 5A shows an example of a range field 500 for a range match. The range field 500 has a maximum value 505 and minimum value 510. The range match determines whether a given key is within the maximum value 505 and minimum value 510 as set in the range field 500. FIG. 5B shows an example of an exact match field 515 for an exact match. The exact match field 515 has a value 520. The exact match determines whether a given key exactly matches the value 520 as set in the exact match field 515.

FIG. 5C shows an example of a prefix field 525 for a prefix match. The prefix field 525 includes a length 530 and value 535. The prefix match determines whether a number of bits, as set by the length 530, of the value 535 matches a first set of bits in a given key. For example, given the length 530 of eight bits, the prefix match matches a first eight bits of a key to the first eight bits of the value 535. FIG. 5D shows an example of a mask field 540 for a mask match. The mask field 540 includes a value 545 and mask 550. The mask match determines whether a given set of bits in a key, as indicated by the mask 550, matches the value 545. Collectively, the content representing these values, are referred to as "dimension data" of a rule.

Classes specified by the rules may overlap. For instance, one key may match several rules. In this case, when several rules overlap, an order in which the rules appear in the classifier may determine the relative priority of the rule. In other words, a key that matched multiple rules belongs to the class identified by the identifier (class ID) of the rule among them that appears first in the classifier. Alternatively, a unique priority associated with a rule may determine its priority, for example, the rule with the highest priority.

The search processor 202 (FIG. 2) includes a component or module called a rule match engine (RME). The RME matches a key against rules to find a match, if any. The RME issues rule I/O accesses to memory to retrieve rules stored in memory. The RME then analyzes the key using the retrieved rules and issues a "match" or "no-match" response depending on whether the key matches one of the retrieved rules.

FIG. 6 shows an example of the RME 600. The RME 600 receives a key 605 and one or more rules 610. In some cases, the rules 610 may be referred to as a "rule chunk," "chunk of rules," or simply "chunk." The rule chunk may include rules that are addressed, sequentially, in memory or are grouped in another manner. In other cases, the rules 610 may formatted as one or more "multi-rules" as described below in detail. The RME 600 also receives a rule format (not shown) describing how the RME 600 divides the key 605 and rules 610 into dimensions (e.g., beginning and ending of each dimension, etc.) and specifying how the RME 600 reads the rules 610.

The RME 600 can be logically divided into three blocks. First, the RME 600 includes a formatting block 615 configured to format rules 610 for processing. Second, the RME 600 includes dimension match engine (DME) blocks 620a-n configured to match dimensions with the key. Third, the RME 600 includes a post processing block 625 that receives all of the processing from the DME block 620a-n and issues a final result 630. The final result 630 is a Boolean 'and' of all dimensions results.

The formatting block 615 receives the key 605 and rules 610. The formatting block 615, based on the key 605, rule 610, and rule format info, outputs formatted dimensions 635a-n to the DME blocks 620a-n. The formatting block 615 outputs as many formatted dimensions 635a-n as there are the DME's in a particular clock cycle. For example, in an RME 600 that includes twelve DME's, the format block 615 can issue twelve formatted dimensions 635a-n to each of the twelve DME's 620a-n. However, the RME 600 can contain any number of DME's. The DME's 620a-n receive the formatted dimension 635a-n and the key 605. The DME's 620a-n process the key 605, comparing it to the formatted dimension 635a-n, and output a respective dimension result 640a-n. The post processing block 615 receives all of the dimension results 640a-n, and performs the Boolean 'and' of all of the dimension results 640a-n to output results 630. Therefore results 630 indicate whether the key 605 matches a particular rule across all of its dimensions.

There are several challenges to encoding and decoding a group of rules. There is the challenge of encoding the rules to take the least amount of space in memory, i.e., storage efficiency. There is also the challenge of decoding the encoded rules, so that the decoded rules can be used to match a key, in the least amount of time using the least amount of processing resources, i.e., runtime lookup efficiency. There are trade-offs in addressing storage efficiency and runtime lookup efficiency.

Figure 7:
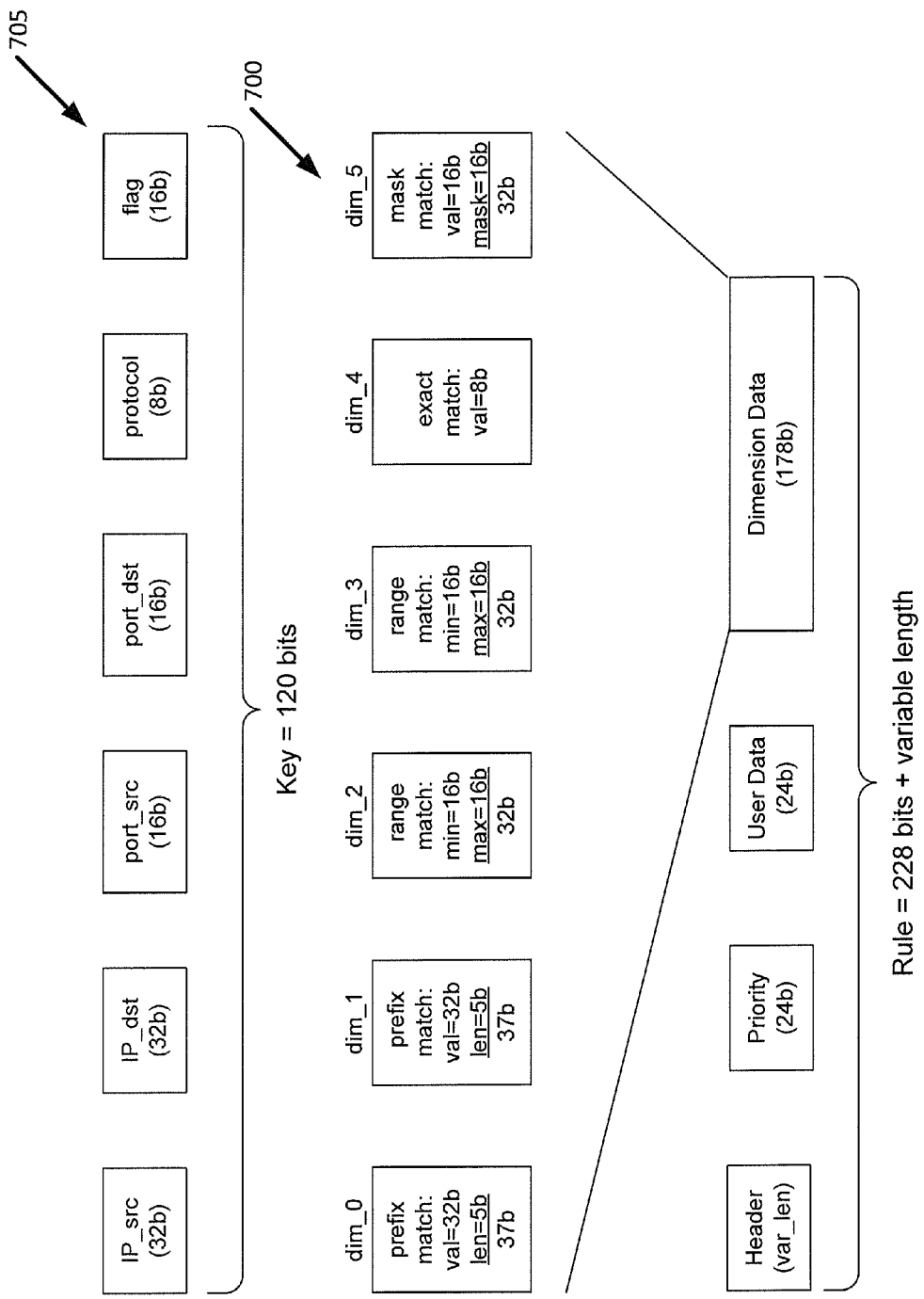
FIG. 7 is a diagram showing an example of an encoded rule.

Consider the example shown in FIG. 7 of encoding a rule 700 used to match a key 705. In this example, the key 705 is an IPv4 header with the fields as shown and is 120 bits in size. The rule 700, also known as a "key matching rule," is a six-tuple rule with six dimensions (dim_0, dim_1, dim_2, dim_3, dim_4, and dim_5). Each of the dimensions contains information used to match one of the fields in the key 705. For example, the first dimension, dim_0, specifies a prefix match using the first five bits of a value given in the dimension. For this prefix match, the RME 600 (FIG. 6) compares the first five bits of the IP address in the source IP field with the first five bits of the value in dim_0 (as described above with the reference to FIG. 5C) and produces a dimension result (as described above with the reference to FIG. 6).

As shown, encoding the key matching rule 700, which includes adding a variable length header, priority field, and user data takes at least 228 bits. The large bit size of the key matching rule 700, compared to the key 705, clearly demonstrates the motivation for approaches to encoding key matching rules efficiently. One such approach is to store only the relevant bits of a given dimension in a key matching rule. The approach reduces the size of the key matching rule. It may be convenient to think about such an approach as being a compression technique.

Decoding the "compressed" rule, however, requires more processing than compared to decoding the key matching rule 700 shown in the FIG. 7. Decoding includes extracting the relevant bits from the key matching rule and the "expanding" the dimension so that it can be used in matching a key. Trade-offs, such as the one described above, are considerations when designing and implementing an approach (or instruction set) for encoding and decoding multiple key matching rules.

Figure 8:
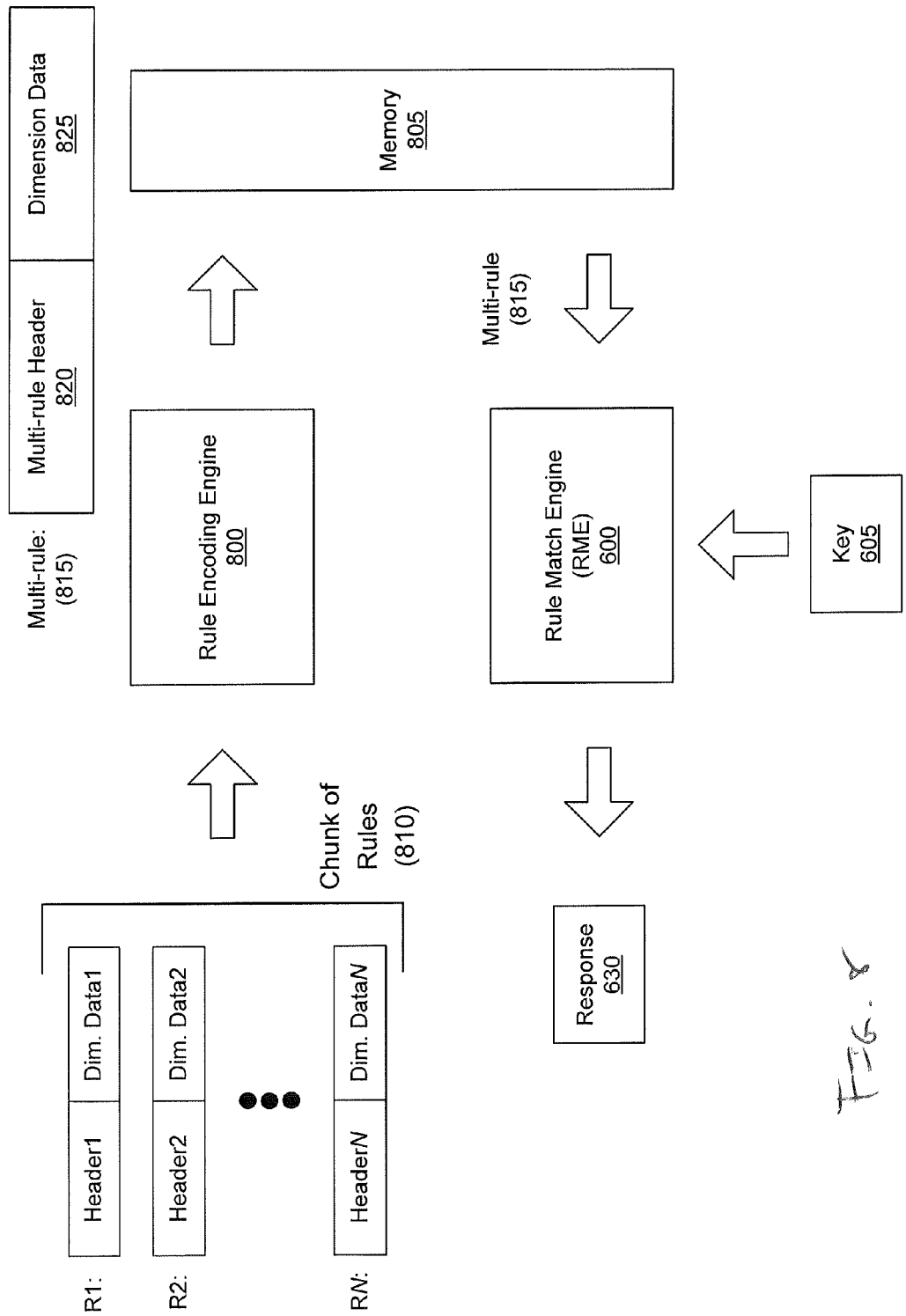
FIG. 8 is a block diagram of an example rule encoding engine.

FIG. 8 shows a rule encoding engine 800 implementing a multi-rule approach to encode multiple key matching rules. For the purpose of describing examples of the multi-rule approach, the multiple key matching rules are grouped in a rule chunk, as described above. In practice, the multiple key matching rules may be a group of rules within a rule chunk (e.g., adjacent rules). Accordingly, in some cases, examples of the multi-rule approach, described herein, apply to both key matching rules grouped in a chunk and key matching rules within a chunk.

Continuing with the figure, the rule encoding engine 800 is communicatively coupled to memory 805 as shown. A chunk of key matching rules 810 is provided to the rule encoding engine 800. The chunk 810 includes a number of key matching rules. Each key matching rule includes a header (Header1, Header2, . . . HeaderN) and dimension data (Dim. Data1, Dim. Data2, . . . Dim. DataN). (Dimension data of a key matching rule is described above with the reference to FIGS. 5A-5D.)

In operation, the rule encoding engine 800 builds a multi-rule 815 for the rules provided. The multi-rule 815 includes a multi-rule header 820 and dimension data 825.

The multi-rule header 820 represents the headers of the key matching rules (Header1, Header2, . . . HeaderN). The dimension data 825 includes the dimension data of the key matching rules (Dim. Data1, Dim. Data2, . . . Dim. DataN). The rule encoding engine 800 stores the multi-rule 815 with multi-rule header 820 and dimension data 825 in the memory 805.

With additional reference to FIG. 6, the RME 600, in response to receiving the key 605, retrieves the multi-rule 815 from memory 805. The formatting block 615 of the RME 600, also called a "decoder," processes the multi-rule 815 and extracts content from the multi-rule header 820 and the dimension data 825. The DME's 620a-n of the RME 600, in turn, match the extracted content against the key 605 and, collectively, provide a match or no-match response 630, as described above with reference to FIG. 6.

Figure 9:
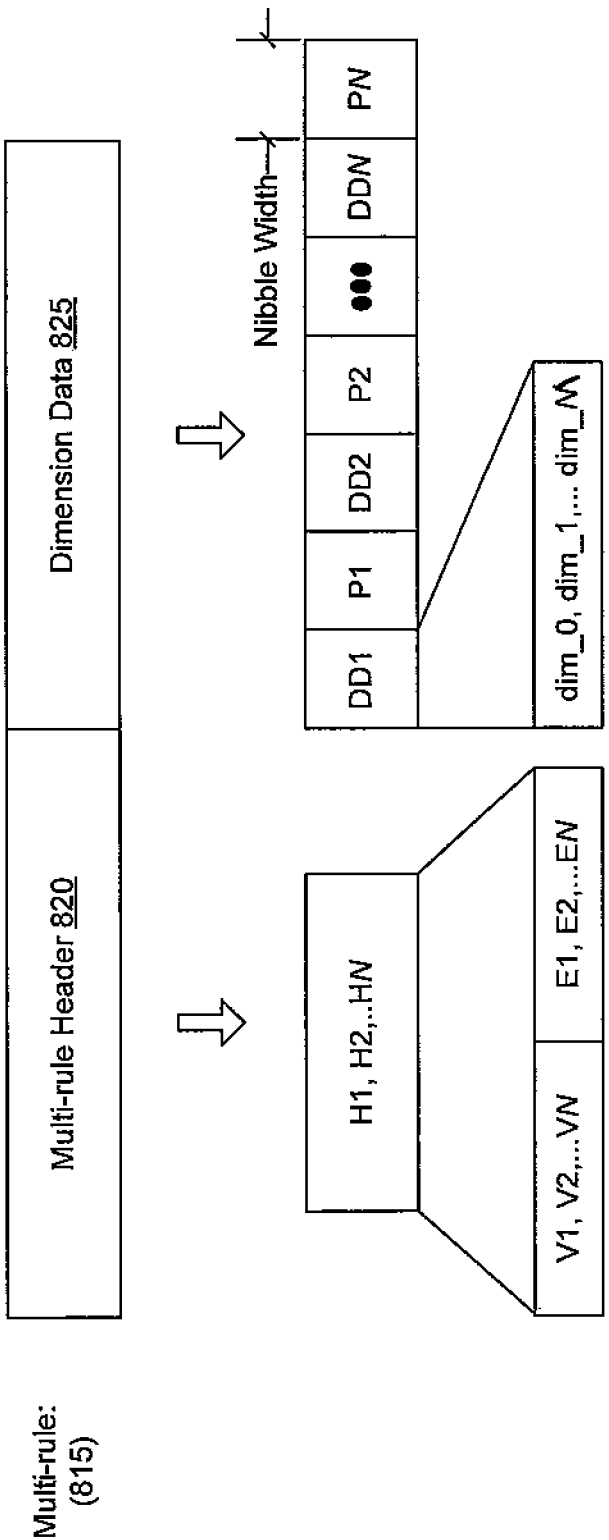
FIG. 9 is diagram of an example of a multi-rule with a multi-rule header and dimension data.

FIG. 9 shows an example of the multi-rule header 820 including a header of each of the key matching rules (H1, H2, . . . HN). The rule encoding engine 800 stores the headers (H1, H2, . . . HN), collectively. One advantage of the multi-rule 815 is the ability to handle multiple rules within a word (or other unit of data to be processed). With this multi-rule formatting the formatting block/decoder 615 (FIG. 6) need only to crack a single header in order to decode multiple rules and issue as many rules and dimension matches as the RME 600 (FIG. 6) can handle. Advantageously, some examples of the RME include a common decoder to crack both a long single rule and a multi-rule of several short rules.

In contrast, according to a prior approach, multiple key matching rules are encoded, sequentially, one rule after the other. The header and dimension data for a first key matching rule (H1 and DD1) are stored first. The header and dimension data for a second key matching rule (H2 and DD2) are then stored after the header and dimension data of the first key matching rule (H1 and DD 1), and so on, resulting in the pattern H1, DD1, H2, DD2 . . . HN, and DDN). In this way, headers of multiple key matching rules are separated by dimension data of multiple key matching rules and are not stored, collectively.

An example of the sequential encoding process includes determining the length of a key matching rule, calculating the start of a next key matching rule based on the determination, and repeating the foregoing steps for as many times as there are number of the key matching rules to be encoded. Decoding multiples key matching rules encoded in the aforementioned manner includes decoding up to N number of headers, extracting fields from up to N number of headers, and calculating up to N number of header lengths. Comparative studies of the sequential approach and the multi-rule approach show that multi-rule header formatting can reduce the area and power of the RME 600 (FIG. 6) by almost 75% in some cases. Further efficiencies can be achieved with one or more of features, including "always match rule," disabling matching of a dimension, interleaving maximum/minimum values, interleaving value/mask values, and moving the priority field of a rule to the end of the rule. These and other features are described below in detail.

Continuing with FIG. 9, the multi-rule header 820 also stores, consecutively, a rule validity value (V1, V2 . . . VN) for each key matching rule of the chunk. The stored rule validity values (V1, V2 . . . VN) determine which rules in the multi-rule 815 are valid and which are not. An invalid rule does not match a key. In one example, storing a first value for a rule validity value corresponding to a key matching rule enables matching of the key matching rule while storing a second value disables matching of the key matching rule.

Figure 10:
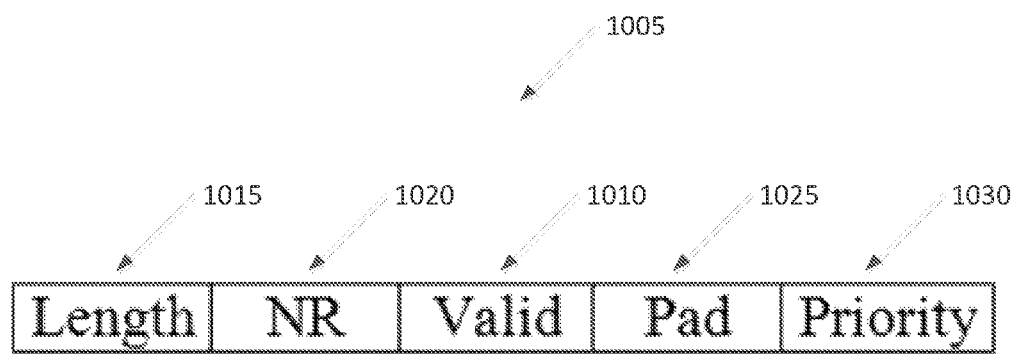
FIG. 10 is diagram of an example of an always/never match rule.

In another example of the multi-rule approach shown in FIG. 10, a multi-rule 1005 includes a rule validity field 1010 storing a rule validity value. When the decoder 615 of the RME 600 (both of FIG. 6) extracts from the rule validity field 1010, a rule validity value having a first value, the RME treats the multi-rule 1005 as always matching. The RME returns a match response to this "always match rule." In cases in which the always match rule is within a rule chunk, the RME stops processing the rule chunk at the always match rule and returns a match response.

When the decoder 615 (FIG. 6) extracts from the rule validity field 1010, a rule validity value having a second value different then the first value, the RME 600 (FIG. 6) treats the multi-rule 1005 as never matching. The RME returns a no-match response to this "never match rule." In cases in which the never match rule is within a rule chunk, the RME stops processing the rule chunk at the never match rule and returns a no-match response. The foregoing always match rule and never match rule are advantageous because the RME can determine a match or no-match response without processing dimension data. In turn, the always match rule and never match rule of the multi-rule approach save processing time and resources.

A convenient example of the multi-rule 1005, as shown, further includes a length field 1015, number of rules field 1020, padding field 1025, and priority field 1030. The length field 1015 stores the length of the multi-rule 1005. The number of rules field 1020 stores the number of rules in the multi-rule 1005. The priority field 1030 stores a priority of the always/never match rule, which may or may not be present. The padding field 1025 stores a number of bits to nibble align the priority field 1030. (The advantage of nibble alignment is described below.)

Returning to FIG. 9, the multi-rule header example 820 stores an enable value (E) for each dimension of the key matching rules of the rule chunk. For example, a rule chunk includes two key matching rules and each rule includes two dimensions, the multi-rule header stores four enable values. For simplicity sake, enable values associated with dimensions of a given key matching rule are denoted in the figure as Ei. For example, E1 in the figure represents the enable values for the dimensions of the key matching rule R1 (FIG. 8). The multi-rule header 820 stores the enable values in consecutive order, i.e., E1, E2, . . . EN. Storing a first value for an enable value corresponding to a subject dimension enables matching of the subject dimension and storing a second value disables matching of the subject dimension.

Figure 11:
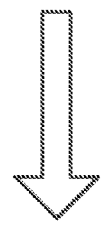
FIG. 11 is diagram of an enable field and associated dimension.

Consider the example shown in FIG. 11 of rule R1 and rule R2, each rule having two dimensions X and Y. Dimension X, is a 16-bit range match and dimension Y is an 8-bit exact match, with values as shown. Dimension X of rule R2 is a "kleen star," which matches all key values. The rule encoding engine encodes the rules R1 and R2 resulting in encoded rules R1 and R2, portions of which are shown in the figure.

The encoded rule R1 includes for each of the dimensions X and Y, a dimension field (dim_X and dim_Y) and enable field (e_X and e_Y) associated with the dimension field. The dimension and enable fields have the values as shown. In a convenient example of the multi-rule approach, the rule encoding engine 800 (FIG. 8) sets a value of an enable field to 1 to enable matching of a dimension associated with the enable field. The RME 600 (FIG. 8), in turn, matches the "enabled" dimension to a corresponding dimension in a key. In the example shown in the figure, for rule R1, the rule encoding engine sets the enable field e_X=1 and the RME matches a range of 10-20 to a dimension of a key.

With respect to the encoded rule R2, the rule encoding engine 800 (FIG. 8) encodes dimension Y, as described above. A prior approach to encoding the kleen star in dimension X, which is a 16-bit range field, includes providing a dimension field having a minimum value of 0 and maximum value of 65535. The designers of the present approach, however, realized that there is no need to match a dimension when the result is always a match for the dimension. Moreover, there are benefits to disabling matching of an "always matching dimension."

According to an example of the multi-rule approach, the rule encoding engine 800 (FIG. 8) disables dimension matching for a given dimension by setting a value of an enable field associated with that dimension to 0. For example, as shown in the figure, for encoded rule R2, the rule encoding engine sets the enable field e_X=0. In turn, the RME 600 (FIG. 8) does not match the "disabled" dimension to a corresponding dimension in a key.

In one example of the multi-rule approach, in processing the encoded rule R2, when the decoder 615 (FIG. 6) extracts the enable field e_X=0 and its associated dimension, the decoder generates a dimension result instead of the sending the dimension to one of the DME's 620*a-n* to be matched. The decoder sends the dimension result to the post processing block 625 (FIG. 6) to be Boolean "and'd" with the dimension results 640*a-n* from the DME's 620*a-n*.

In a convenient example of the multi-rule approach, rule encoding engine 800 (FIG. 8) instructs the decoder not to assign a dimension match engine to the subject dimension. In this example, no match is performed and no dimension result is provided. The post processing block Boolean "ands" one less input. This may be referred to as "squashing invalid dimension."

Disabling dimension matching, as described above, is particular advantageous when resources to match key and rule dimensions are limited. With reference to FIG. 6, the decoder 615 in the RME 600 assigns a dimension to one of the DME's 620*a-n* to match against a dimension of a key. The number of the DME's is limited (e.g., 12). This limits the number of dimensions that can be processed per clock cycle. Suppose in one clock cycle, a rule chunk (pushed to the RME) includes more dimensions then there are DME's. In such an instance, the RME stalls and takes multiple clock cycles to retire one rule chunk.

With the multi-rule approach, by setting enable values of some of the dimensions and disabling matching, some dimensions are not assigned to DME's. With DME's available to process other dimensions, it is possible with the multi-rule approach to process an entire rule chunk in one clock cycle. Also with the multi-rule approach, a number of DME's in the RME can be reduced and advantageously still do a same amount of work as a number of DME's processing every dimensions, including always matching dimensions.

Returning to FIG. 9, the figure shows an example of the dimension data 825 of the multi-rule 815. The dimension data 825 includes dimension data of each rule (dim_0, dim_1, . . . dim_M) in the multi-rule 815. In a convenient example of the multi-rule approach, for each rule in the multi-rule 815, the rule encoding engine 800 (FIG. 8) packs dimensions, sequentially, starting with the 0th dimension followed by the first dimension, second dimension, etc. to the last dimension of a given rule (i.e., dim_0, dim_1, . . . dim_M).

In some examples of the multi-rule approach, the rule encoding engine does not store bits for a dimension having an associated enable value of 0 and dimension matching disabled. For example, if an enable field of a rule with four dimensions (dim_0, dim_1, dim_2, and dim_3) has a binary value of 1011 (i.e., dim_1 has an enable value of 0) the rule encoding engine includes bits (content) for dim_0, dim_2, and dim_3 in a multi-rule and leaves out bits for dim_1. It may be convenient to say that the rule encoding engine 800 (FIG. 8) "removes" bits for a dimension. In cases in which a multi-rule does not include an enable field for a rule, the rule encoding engine assumes that all dimensions in that rule are enable for matching and packs all the dimension bits into the multi-rule.

In another example of the multi-rule approach, the rule encoding engine packs bits of a given dimension into the dimension data of a multi-rule based on a match type of that dimension (i.e., exact match, prefix match, range match, and mask match). For a range type match with the maximum value and minimal value, the rule encoding engine interleaves the maximum and minimum values in a range field.

In the example shown in FIG. 12, a range match 1200 includes a four-bit maximum value and a four-bit minimum value. The maximum and minimum values are each written in binary from left to right, from high bit (3) to low bit (0). The rule encoding engine 800 (FIG. 8) interleaves the high bits (bits 3 and 2) of the maximum and minimum values and the low bits (bits 1 and 0) of the maximum and minimum values forming an interleaved value that is packed in a range field 1205, as shown. In yet another example of the multi-rule approach, the rule encoding engine forms an interleaved value packed in a range field 1210, as shown, by interleaving low bits (bits 1 and 0) of the maximum and minimum values and interleaving high bits (bits 3 and 2).

The foregoing process of interleaving maximum and minimum values of a range (e.g., 4 bits at time) may be referred to as nibble interleaving range match data. Mask match data, a pairing of value and mask, may also be nibble interleaved as described above. Nibble interleaving range and mask match data in a multi-rule is advantageous because it enables a single shifter in a DME to extract two fields. Without interleaving, two shifters are required to extract two fields. Eliminating one shifter from each of the DME's 620*a-n* (FIG. 6) in the RME 600 (FIG. 6) by nibble interleaving range and mask match data saves power and area in the RME.

Returning to FIG. 9, the figure shows a convenient example of the multi-rule approach in which a priority field for a given rule is encoded at the end of that rule. The rule encoding engine 800 (FIG. 8) encodes a priority field for a first rule (PF1) after dimension data for the first rule (DD1). For a second rule, the rule encoding engine encodes dimension data DD2 after the priority field PF1 and encodes a priority field PF2 after the dimension data DD2. The rule encoding engine continues encoding each rule of the multi-rule following the foregoing pattern.

The approach of encoding a priority field at the end of a rule is advantageous compared to the prior approach of placing priority fields in the rule headers of key matching rules. To process priority fields in rule headers it is necessary to extract up to N priority fields for N rules, manage these priority fields and store them in a FIFO (first in, first out) or other expensive data structure until rules that match are found at (or near) the end of a match pipeline.

With the multi-rule approach, by moving priority fields to the ends of the rules, it is not necessary to extract, manage and store multiple priority fields. A single priority payload for a successful match of a rule can be found right after the last dimension of such a matching rule. A convenient example of the multi-rule approach eliminates the FIFO structure of the prior approach and 75% of the shifters needed to extract priority fields from rule headers.

FIG. 9 further shows the dimension data DD1 preceding the priority field PF1 nibble aligned by the rule encoding engine 800 (FIG. 8). The rule encoding engine also nibble aligns the dimension data DD2 (or in some cases, a header) following the priority field PF1. Because both beginning and end of the priority field PF1 are nibble aligned the priority field PF1 has a "nibble width." Nibble alignment and nibble width are beneficial because they further simplify the process of extracting a priority field. The extraction process requires a nibble shifter and not a bit shifter, as previously required in other approaches. Additionally, calculations using the width of the priority field in nibbles are faster and smaller than similar calculations in bits.

In another example of the multi-rule approach, the rule encoding engine 800 (FIG. 8) interleaves "stmin" and "data" fields in a priority field. This example cuts the cost of extracting a single priority payload, as described above, in half. Similar to interleaving range and mask dimension data, described above with reference to FIG. 12, interleaving "stmin" and "data" in the priority field reduces the number of shifters required from two to one.

A convenient example of the multi-rule includes the following fields: LEN, N, VLD, {DIM_VLD}, M×PL, N×(DIMs {PRI}). The LEN field includes a length of the multi-rule. The N field includes a number of key matching rule in the multi-rule. The VLD field includes validity values indicating which key matching rules in the multi-rule are valid and which are invalid, as described with reference to FIG. 9. The curly brackets '{ }' denote optional fields in the multi-rule. The DIM_VLD field, an optional field, includes enable values indicating which dimensions are enabled for matching and which are not, as described above with reference to FIG. 11. The PL field includes the lengths of prefixes used in prefix matches, as described above with reference to FIG. 5C.

The expression N×(DIMs {PRI}) represents the dimension data of the multi-rule. As described above with reference to FIG. 9, in some examples of the multi-rule, the dimension data of the multi-rule includes dimension data and priority of the key matching rules. As represented, dimension data and priority for a first rule is followed by dimensional data and priority for a second rule, and so on for N rules.

Provided with a multi-rule with the format described above, an example of the decoder 615 (FIG. 6) uses a single shifter to extract content from the LEN, N, VLD, and DIM_VLD fields for up to N rules. The example decoder uses a second shifter to extract content from the PL field for up to N rules. Fewer shifters are needed to extract content from the multi-rule than compared to extracting similar content from multiple rules. Advantageously, this reduces the power and area of the RME 600 (FIG. 6).

The above-described methods and systems can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

The rule encoding engine 800 (FIG. 8) may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., the rule encoding engine 800 of FIG. 8) cause the one or more processors to carry out or implement the features and functionalities of various examples discussed herein. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for encoding a plurality of key matching rules grouped in a chunk, each of the key matching rules beginning with a header and having at least one dimension, the method comprising:
   in a rule encoding engine, communicatively coupled to memory and provided with a chunk of key matching rules, building a multi-rule corresponding to the chunk comprising:
   storing in the memory a multi-rule header of the multi-rule, the multi-rule header representing, collectively, a plurality of headers stored one after the other, the multi-rule header being decoded by a rule matching engine in a single decode operation to extract the plurality of headers of the key matching rules, wherein the plurality of headers include values which control the rule matching engine processing of the key matching rules, including dimensions, the rule matching engine formats the key matching rules based on a key and matches the key matching rules against the key to find a match based on the values stored in the plurality of headers.

2. The method of claim 1 wherein storing the multi-rule header of the multi-rule further includes storing, consecutively, a rule validity value for each of the key matching rules of the chunk in which storing a first value for the rule validity value corresponding to a subject key matching rule enables matching of the subject key matching rule, while storing a second value instead of the first value disables matching of the subject key matching rule.

3. The method of claim 2 wherein storing the rule validity values includes, given a key matching rule that always matches, storing a rule validity value having a third value; and given another key matching rule that never matches, storing a rule validity value having a fourth value instead of the third value.

4. The method of claim 1 wherein storing the multi-rule header of the multi-rule further includes, given key matching rules each having at least one dimension, storing, consecutively, an enable value for each dimension in which storing a first value for the enable value corresponding to a subject dimension enables matching of the subject dimension, while storing a second value instead of the first value disables matching of the subject dimension.

5. The method of claim 4 wherein disabling matching of the subject dimension further includes instructing a decoder to provide an always match dimension result.

6. The method of claim 4 wherein disabling matching of the subject dimension further includes instructing a decoder not to assign a dimension match engine to the subject dimension.

7. The method of claim 4 wherein disabling matching of the subject dimension further includes masking the subject dimension for a decoder.

8. The method of claim 1 wherein storing the multi-rule header of the multi-rule further includes storing, consecutively, a priority value for each of the key matching rules of the chunk in which storing a priority value for subject key matching rule indicates a priority of the subject key matching rule relative to the key matching rules of the chunk.

9. The method of claim 1 wherein the chunk includes two key matching rule.

10. The method of claim 1 further comprising, given a key matching rule having at least one dimension, storing in the memory a value associated with the at least one dimension, the value being stored as dimension data of the multi-rule.

11. The method of claim 10 wherein storing the dimension data of the multi-rule further includes for a given key matching rule of the chunk, storing a priority value at the end of the dimension data stored for the rule in the multi-rule.

12. The method of claim 10 wherein storing the dimension data of the multi-rule includes, given a dimension of the subject key matching rule is a range field with a minimum value and a maximum value, interleaving the minimum value with the maximum value to form an interleaved value; and storing in the memory the interleaved value of the range field associated with the subject key matching rule.

13. The method of claim 10 wherein storing the dimension data of the multi-rule includes, given a dimension of the subject key matching rule is a mask field with a value and a mask, interleaving the value with the mask to form an interleaved value; and storing in the memory the interleaved value of the mask field associated with the subject key matching rule.

14. A system for encoding one or more a plurality of key matching rules grouped in a chunk, each of the key matching rules including beginning with a header and having at least one dimension, the system comprising:

a memory;

at least one interface for receiving a chunk of key matching rules;

a rule encoding engine communicatively coupled to the memory and the at least one interface, the rule encoding engine configured to build a multi-rule corresponding to the chunk by:

storing in the memory a multi-rule header of the multi-rule, the multi-rule header representing, collectively, a plurality of headers stored one after the other, the multi-rule header being decoded by a rule matching engine in a single decode operation to extract the plurality of headers of the key matching rules, wherein the plurality of headers include values which control the rule matching engine processing of the key matching rules, including dimensions, the rule matching engine formats the key matching rules based on a key and matches the key matching rules against the key to find a match based on the values stored in the plurality of headers.

15. A tangible non-transitory computer-readable storage medium having computer readable instructions stored therein for encoding a plurality of key matching rules grouped in a chunk, each of the key matching rules beginning with a header, which when executed by a rule encoding engine, provided with a chunk in which each key matching rule of the chunk has at least one dimension, cause the rule encoding engine to build a multi-rule corresponding to the chunk by:

storing in memory, communicatively coupled to the rule encoding engine, a multi-rule header of the multi-rule, the multi-rule header representing, collectively, a plurality of headers stored one after the other, the multi-rule header being decoded by a rule matching engine in a single decode operation to extract the plurality of headers of the key matching rules, wherein the plurality of headers include values which control the rule matching engine processing of the key matching rules, including dimensions, the rule matching engine formats the key matching rules based on a key and matches the key matching rules against the key to find a match based on the values stored in the plurality of headers.

* * * * *

UNITED STATES PATENT AND TRADEMARK OFFICE
CERTIFICATE OF CORRECTION

PATENT NO.         : 9,544,402 B2
APPLICATION NO.    : 14/145918
DATED              : January 10, 2017
INVENTOR(S)        : Frank Worrell et al.

Page 1 of 1

It is certified that error appears in the above-identified patent and that said Letters Patent is hereby corrected as shown below:

In the Claims

Column 17, Lines 22-25, Claim 14 preamble:
"A system for encoding one or more a plurality of key matching rules grouped in a chunk, each of the key matching rules including beginning with a header and having at least one dimension, the system comprising:"

Should read:
--A system for encoding a plurality of key matching rules grouped in a chunk, each of the key matching rules beginning with a header and having at least one dimension, the system comprising:--

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*